United States Patent
Kies

(10) Patent No.: US 6,970,580 B2
(45) Date of Patent: Nov. 29, 2005

(54) SYSTEM AND METHOD FOR MAINTAINING A VIDEO IMAGE IN A WIRELESS COMMUNICATION DEVICE

(75) Inventor: Jonathan K. Kies, Encinitas, CA (US)

(73) Assignee: Qualcomm Incorporated, San Diego, CA (US)

( * ) Notice: Subject to any disclaimer, the term of this patent is extended or adjusted under 35 U.S.C. 154(b) by 507 days.

(21) Appl. No.: 10/099,844

(22) Filed: Mar. 13, 2002

(65) Prior Publication Data

US 2003/0072474 A1   Apr. 17, 2003

Related U.S. Application Data

(60) Provisional application No. 60/348,113, filed on Oct. 17, 2001.

(51) Int. Cl.$^7$ .............................. G06K 9/00; H04N 7/14; H04N 7/20
(52) U.S. Cl. .................. 382/118; 348/14.02; 455/422.1
(58) Field of Search ...................... 382/118, 165, 181, 382/274, 295, 312; 455/73, 3.01, 403, 422.1; 348/515, 14.02

(56) References Cited

U.S. PATENT DOCUMENTS

| | | | |
|---|---|---|---|
| 6,177,950 B1 * | 1/2001 | Robb | 348/14.01 |
| 6,310,609 B1 * | 10/2001 | Morgenthaler | 345/170 |
| 6,459,882 B1 * | 10/2002 | Palermo et al. | 455/41.1 |

FOREIGN PATENT DOCUMENTS

| | | |
|---|---|---|
| EP | 0550172 | 7/1993 |
| EP | 0756426 | 1/1997 |
| EP | 0884905 | 12/1998 |

* cited by examiner

Primary Examiner—Kanjibhai Patel
(74) Attorney, Agent, or Firm—Philip Wadsworth; Charles D. Brown; Howard H. Seo

(57) ABSTRACT

A wireless communication device (100) may include a video-input device (118), a signaling device (128), video-conferencing capabilities and other features. An image-recognition processor (126) selectively generates feedback signals based on characteristics of a face in an image received by the video-input device (118). In one embodiment, these feedback signals are used to selectively control the signaling device (128) to communicate to a user characteristics of the face in the image received by the video-input device (118), so that the user may take appropriate action if desired.

13 Claims, 4 Drawing Sheets

SYSTEM 100

SYSTEM 100

EXAMPLES OF FACES RECEIVED BY
THE SYSTEM 100

FACE WITHIN
TOLERANCES

NO FACE

FACE OFF CENTER

FACE TOO SMALL

FACE TOO BIG

IMPROPERLY-ORIENTED
FACE

FACE TOO DARK

GLARE ON THE FACE

SYSTEM AND METHOD FOR MAINTAINING A VIDEO IMAGE IN A WIRELESS COMMUNICATION DEVICE

RELATED APPLICATIONS

This application claims priority from U.S. Provisional Application Ser. No. 60/348,113, filed Oct. 17, 2001, the content of which is incorporated herein by reference in its entirety.

BACKGROUND OF THE INVENTION

Field of Invention

The present invention is directed generally to a wireless communication device, and, more particularly, to a system and method for maintaining a video image in a wireless communication device.

Wireless communications devices, such as cellular telephones, typically include a housing and various data input and output devices, such as a keyboard, a display, a microphone and a speaker. In addition, some wireless communications devices have video conferencing capabilities.

The mobile nature of a wireless communication device and the small display increase the probability that a video conferencing user will transmit a video image that is too dark, too bright, too close, too far, improperly centered, or improperly oriented in the video-image frame. Therefore, it can be appreciated that there is a significant need for a system and method of maintaining proper a video image, either by signaling the need for action to the user or by automatically adjusting the wireless communication device, or some combination thereof. The present invention provides this and other advantages, as will be apparent from the following detailed description and accompanying figures.

SUMMARY OF THE INVENTION

The present invention is embodied in a system and method for recognizing characteristics in a video image in a wireless communications device. In one embodiment the system includes a housing, a transceiver, a display capable of displaying video images, a signaling device such as a ringer or a speaker, and a video-input device, such as a camera or lens. The system also includes an image-recognition processor. The image-recognition processor can be configured to generate feedback based on characteristics of the video image received by the video-input device. The user or the communications device can then use this information to maintain or adjust the video image received by the video-input device.

DETAILED DESCRIPTION OF THE PREFERRED EMBODIMENTS

The present invention provides feedback on a video image received by a video-input device of a wireless communications device, and as a result enables a user or the wireless communications device to take appropriate action to maintain or adjust characteristics of the video image. The present invention may be readily implemented in any wireless communication device. Although the examples presented herein refer to a cellular phone, the principles of the present invention are applicable to any wireless communication device, including, but not limited to, analog and digital cellular telephones, personal communications system (PCS) devices, and the like. The present invention is embodied in a system 100 illustrated in the functional block of FIG. 1. The system 100 includes a central processing unit (CPU) 102, which controls operation of the system. A memory 104, which may include both read-only memory (ROM) and random-access memories (RAM), provides instructions and data to the CPU 102. A portion of the memory 104 may also include non-volatile random-access memory.

Figure 1:
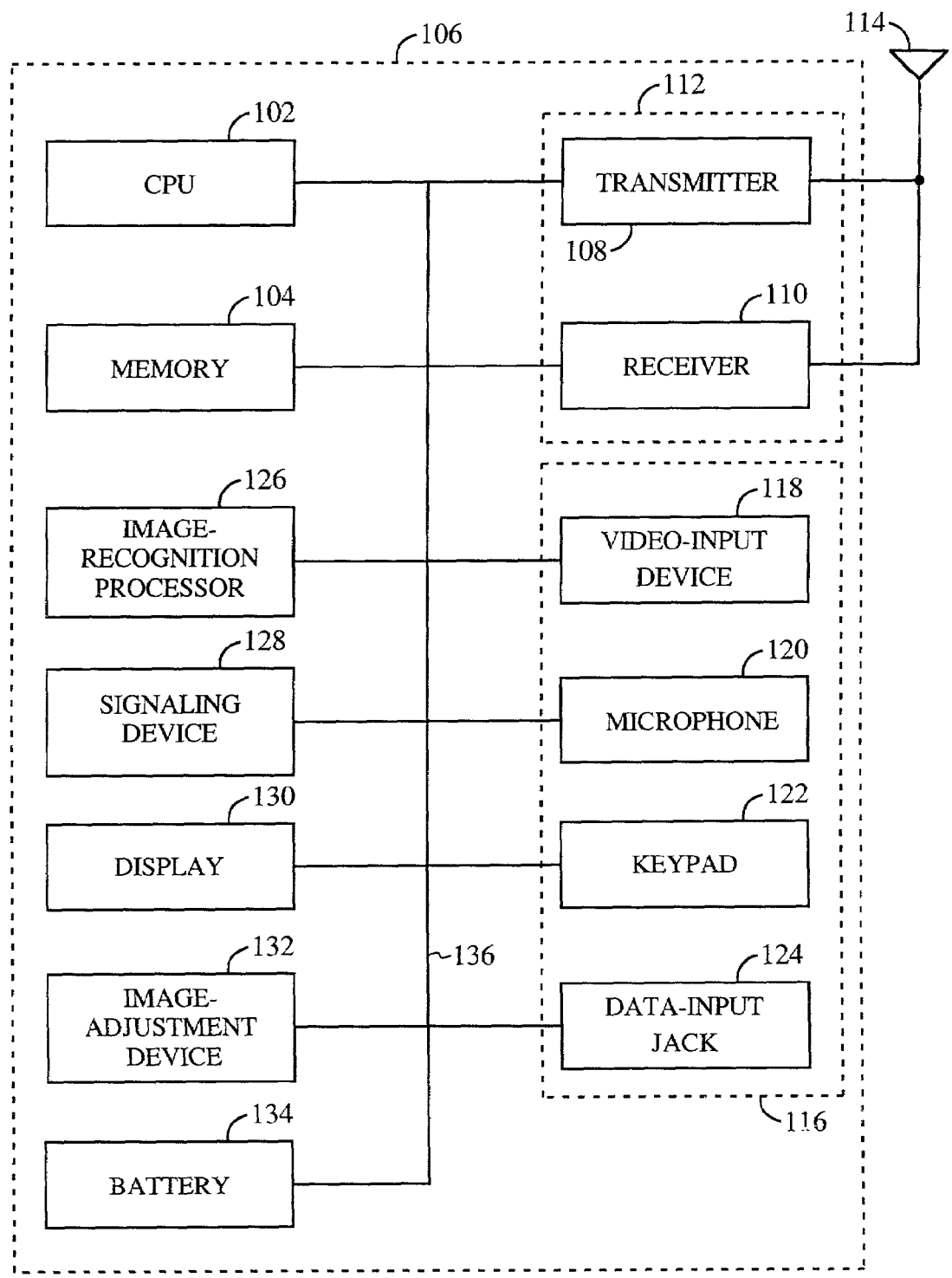
FIG. 1 is a functional block diagram of a wireless communication device implementing the present invention.

The system 100, which is typically embodied in a wireless communication device such as a cellular telephone, also includes a housing 106 that contains a transmitter 108 and a receiver 110 to allow transmission and reception of data, such as audio and video communications and programming data, between the system 100 and a remote location, such as a base transceiver station (BTS) 150 (see FIG. 3), a remote video-conferencing center 152 (see FIG. 3), another system 100, or the like. The transmitter 108 and the receiver 110 may be combined into a transceiver 112. An antenna 114 is attached to the housing 106 and electrically coupled to the transceiver 112. The operation of the transmitter 108, receiver 110, and antenna 114 is well-known in the art and need not be described herein. Although FIG. 1 illustrates the antenna 114 as extending from the housing 106, some designs may include an internal antenna that is contained completely within the housing. The transmitter 108, the receiver 110, and the antenna 114, however, operate in a conventional manner regardless of the location of the antenna.

A user-input device 116, comprising at least a video-input device 118, is communicatively linked to the system 100 for operation by the user in a conventional manner. The user-input device 116 provides a convenient means by which destination telephone numbers, commands, video images, voice data and other data may be entered by the user. Although FIG. 1 illustrates the user-input device 116 as comprising a video-input device 118, a microphone 120, a keypad 122, and a data-input jack 124 contained within the housing 106, other user input devices may be used, such as the receiver, and the like, and in various combinations. In addition, while the video-input device 118 may be a camera (see FIG. 3), one skilled in the art will recognize that other video-input devices 118 may be used, including the data-input jack 124, the receiver 110, and the like, and in various combinations.

The system 100 also includes an image-recognition processor 126, which may typically be included in the CPU 102. As will be discussed in greater detail below, system 100 may use the image-recognition processor 126 to generate feedback signals based on selected characteristics of a face in a video image received by the video-input device 118. The image-recognition processor 126 uses pattern-recognition methods which are known in the prior art to recognize selected characteristics of a face in a video-image received by the video-input device 118, such as the lighting, location, size and orientation of the face in the video image. Pattern-recognition methods are not the subject of this invention and will not be discussed in detail herein.

The image-recognition processor 126 compares characteristics of the face in the video image received by the video-input device 118, such as the lighting, location, size, or orientation of the face, to a predetermined set of undesirable face-characteristics, such as characteristics indicating the face is improperly lighted, located, sized, or oriented. The predetermined set of face characteristics may be stored, by way of example, in the memory 104. If the correlation between the characteristics of the face in the video image received by the video input device 118 and one of the predetermined face-characteristics exceeds a threshold value, the image-recognition processor 126 determines that the face in the video image received by the video-input device 118 possesses the predetermined face-characteristic. One skilled in the art will recognize that the image-recognition processor 126 may also rely on other data to determine whether a face in the video image possesses a predetermined face-characteristic, such as user-entered data or data received from a light-sensor (not shown) or a Doppler-ranging system (not shown), or the like, and in various combinations.

The image-recognition processor 126 may be readily implemented as a series of software instructions placed in the memory 104 and executed by the CPU 102. Thus, minor software modifications to existing hardware will allow the implementation of the system 100.

In one embodiment, the system 100 also includes a signaling device 128, to signal the user if one of the predetermined face-characteristics are present in the face in the video-image received by the video-input device. One skilled in the art will recognize that a signaling device 128 may be a ringer, a buzzer, a vibrator, a flashing light, a speaker, a display 130, and the like, and various combinations thereof. As will be discussed in more detail below, the image-recognition processor 126 may generate control signals based on the presence of one or more predetermined face-characteristics in the video image received by the video-input device to selectively operate the signaling device 128.

In another embodiment, the system 100 also includes an image-adjustment device 132 to adjust the video image received by the video-input device 118, which may or may not be incorporated into the video-input device 118. One skilled in the art will recognize that the image-adjustment device 132 may be a light, a focusing lens, a horizontal or vertical frame adjustment mechanism, and the like and various combinations thereof. As will be discussed in more detail below, the image-recognition processor 126 may automatically generate control signals based on the presence of one or more predetermined face-characteristics in the video image received by the video-input device 118 to selectively control the image-adjustment device 132.

Electrical components of the system 100 receive power from a battery 134, which is attached to and supported by the housing 106. In an exemplary embodiment, the battery 134 is a rechargeable battery. In other embodiments, the system 100 may include a connector (not shown) for the connection of an external power source, such as an automobile power adapter, AC power adapter, or the like.

The various components of the system 100 are coupled together by a bus system 136 which may include a power bus, control bus, and status signal bus in addition to a data bus. For the sake of clarity, however, the various buses are illustrated in FIG. 1 as the bus system 136.

Figure 2:
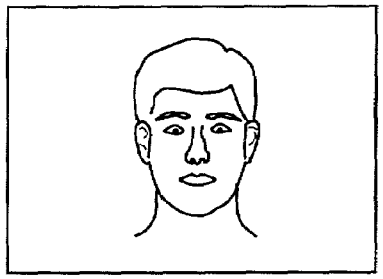
FIG. 2 illustrates examples of characteristics of a face in an image received by the system of FIG. 1.
Figure 2:
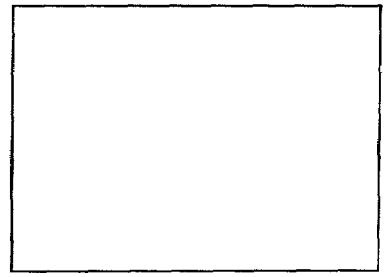
Figure 2:
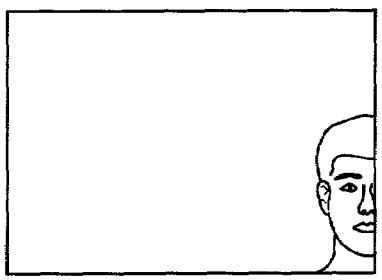
Figure 2:
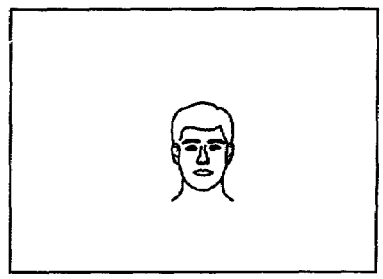
Figure 2:
Figure 2:
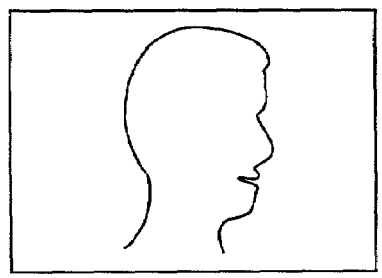
Figure 2:
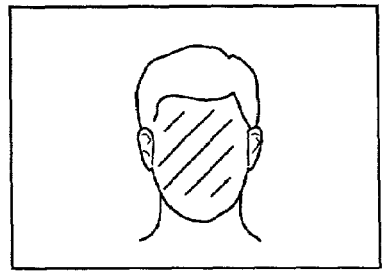
Figure 2:
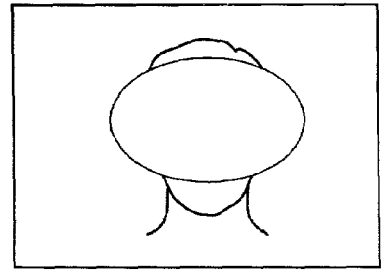

FIG. 2 illustrates some desirable and undesirable characteristics that may be present in a face in a video image received by the system 100. For example, the face may be within tolerances, there may be no face present in the image, the face may be off-center, the face may be too small or too big, the face may be improperly-oriented, the face may be too dark, or there may be glare on the face. One skilled in the art will recognize that a video image received by a wireless communications device may have a variety of characteristics, and in various combinations, which can be maintained or adjusted by the user or by automatically adjusting the wireless communication device, or by some combination thereof.

Figure 3:
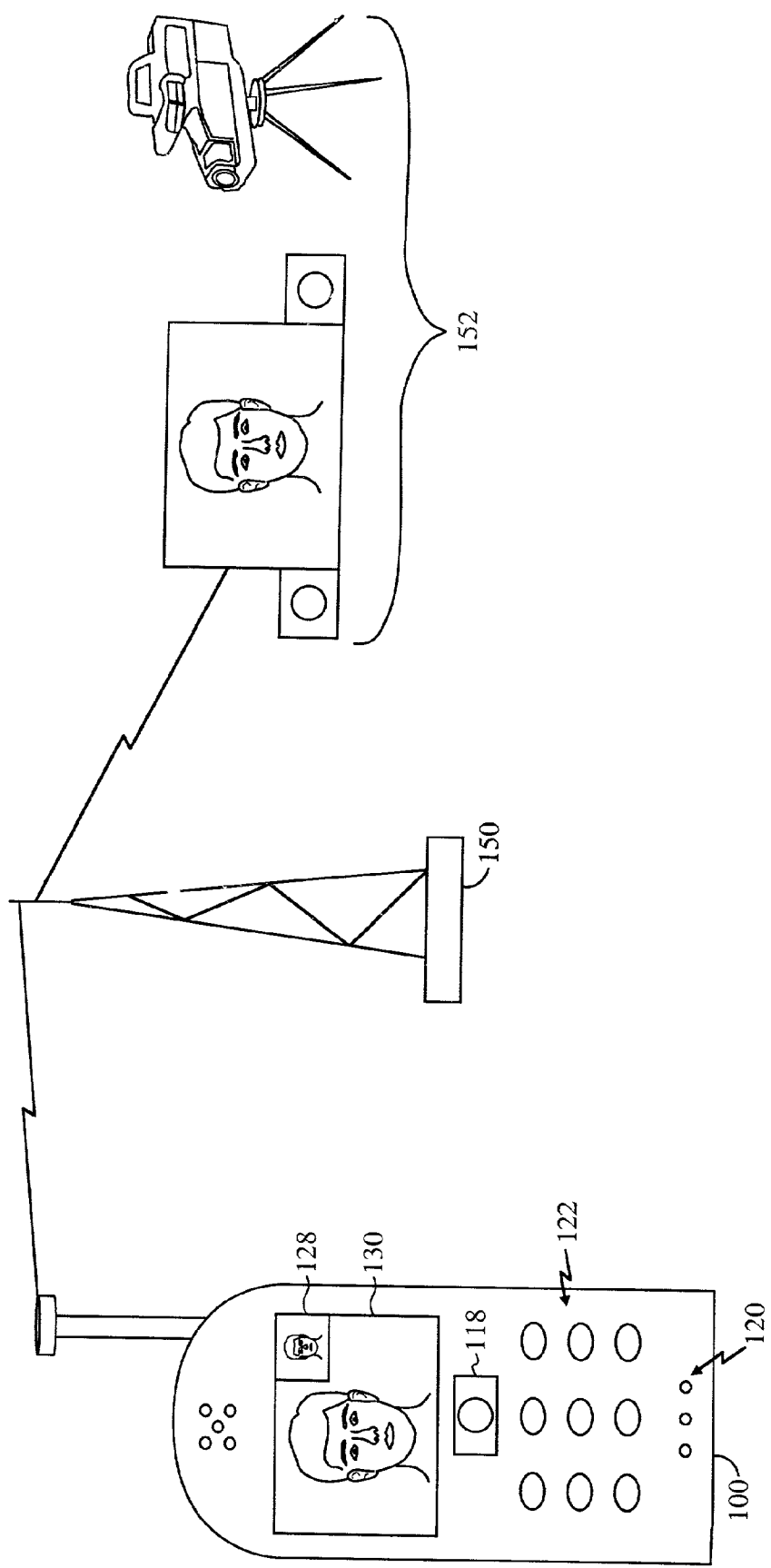
FIG. 3 illustrates the operation of the system of FIG. 1 to transmit a video image to a remote location.

FIG. 3 illustrates the operation of the system 100 to transmit the video image to a remote location, such as a BTS 150 or a remote video conferencing center 152. One skilled in the art will recognize that the video image may be transmitted to a variety of remote locations, such as another system 100, or the like. For the sake of brevity, the system 100 will be described using a limited number of examples.

In one embodiment, the system 100 is configured to receive and analyze a face in a video image received by the video input device 118 (see FIG. 1) and alert the user if one of a set of predetermined face-characteristics is present in the face in the video image so that the user may take action if desired. In this embodiment, the image-recognition processor 126 is configured to compare characteristics of a face in a video image to a predetermined set of face-characteristics and selectively generate a feed-back signal based on the comparison.

The user may provide an image, which has one of a set of predetermined face-characteristics, to the video-input device 118. For example, the user may provide the video-input device 118 with an image of a face which is too small. The image-recognition processor 126 receives the video image from the video-input device 118. The image-recognition processor 126 analyzes characteristics of the face in the video image, such as the size of the face. The image-recognition processor 126 compares the characteristics of the face in the video image to a predetermined set of face-characteristics. In this example, the image-recognition processor 126 determines that the characteristics of the face in the video image match the characteristics of a face which is too small. Based on the comparison, the image-recognition processor 126 selectively generates a feedback signal corresponding to the presence of one of the set of face-characteristic in the face in the video image.

The signaling device 128 receives the selectively-generated feed-back signal from the image-recognition processor 126. The signaling device 128 selectively generates a user-signal to indicate to the user that one of the predetermined face-characteristics is present in the video image. For example, the signaling device 128 may make a noise, vibrate, flash a light, or display an error message or a video image. In response to the user-signal, the user may take action to maintain or adjust the video image, in this example, the user may move closer to the video-input device 118.

In another embodiment, the system 100 is also configured to convey information to the user related to the comparison of the face in the video image to the predetermined set of face characteristics. In this embodiment, the selectively generated feedback signal is one of a set of predetermined feedback signals corresponding to the set of predetermined face-characteristics and the user-signal is one of a set of predetermined user-signals corresponding to the predetermined set of feedback signals.

For example, the user may provide an image of a face which is improperly positioned to the video input device 118 and thus cuts off a portion of the face. The image-recognition processor 126 receives the video image from the video-input device 118. The image-recognition processor 126 analyzes the characteristics of the face in the video image, such as the location of the face. The image-recognition processor 126 compares the characteristics of the face in the video image to a predetermined set of face-characteristics. In this example, the image-recognition processor 126 determines that the characteristics of the face in the video image match the characteristics of a face, which is improperly positioned. Based on the comparison, the image-recognition processor 126 selectively generates one of a predetermined set of feedback signals, in this example a feedback signal corresponding to a face in the video image which is improperly positioned.

The signaling device 128 receives the selectively-generated feed-back signal from the image-recognition processor 126. The signaling device 128 selectively generates a user-signal corresponding to the selectively generated feedback signal. For example, the signaling device 128 selectively generates a user-signal corresponding to the feedback signal corresponding to a face in the video image which is positioned too low. One skilled in the art will recognize that the signaling device 128 may signal the presence of one of the predetermined set of face-characteristics in various manners and combinations thereof. In this example, for instance, the signaling device 128 may make a noise indicating that the image is off-center, may state or flash the message "image too low", or the like, or may show a picture or a video image on the display 130, or in a portion of the display 130, indicating that the face in the image is too low, or the like, and in various combinations. In this example, the user may respond to the user-signal by adjusting the video-input device 118 or repositioning themselves, or some combination thereof, so that the face in the image received by the video-input device 118 is raised.

In another embodiment the system 100 is configured to receive and analyze a face in a video image received by the system 100 and automatically adjust the video image if one of a set of predetermined face-characteristics is present in the face in the video image. In this embodiment, the image-recognition processor 126 is configured to compare characteristics of a face in the video image to a predetermined set of face-characteristics and selectively generate one of a set of predetermined feedback signals based on the comparison. The image-adjustment device 132 is configured to adjust the image received by the video-input device 118, wherein the adjustment is based at least in part on the selectively-generated feedback signal.

For example, image of a face received by the video-input device 118 may be too dark. The image-recognition processor 126 receives the video-image from the video-input device 118. The image-recognition processor 126 analyzes characteristics of the face in the video-image, such as the lighting on the face. The image-recognition processor 126 compares the characteristics of the face in the video image to a predetermined set of face-characteristics. In this example, the image-recognition processor 126 determines that the characteristics of the face in the video image match the characteristics of a face that is too dark. Based on the comparison, the image-recognition processor 126 selectively generates one of a set of predetermined feedback signals, in this example a feedback signal corresponding to a face in the video image that is too dark.

The image-adjustment device 132 receives the selectively generated feedback signal from the image-recognition processor 126 and adjusts the image received by the video-input device 118 based, at least in part, on the selectively generated feedback signal. In this example, the image-adjustment device 132 may be a light which is activated in response to the selectively-generated feedback signal to adjust the brightness of the image received by the video-input device 118, an automatically adjustable lens of the video-input device 118, an electrical gain adjustment to boost the brightness of the video signal, or the like.

Those skilled in the art will recognize that the video-images, face-characteristics, feedback signals, user-signals, and adjustments used above are illustrative only and that the present invention is not limited to the specific video-images, face-characteristics, feedback signals, user-signals and adjustments mentioned.

Figure 4:
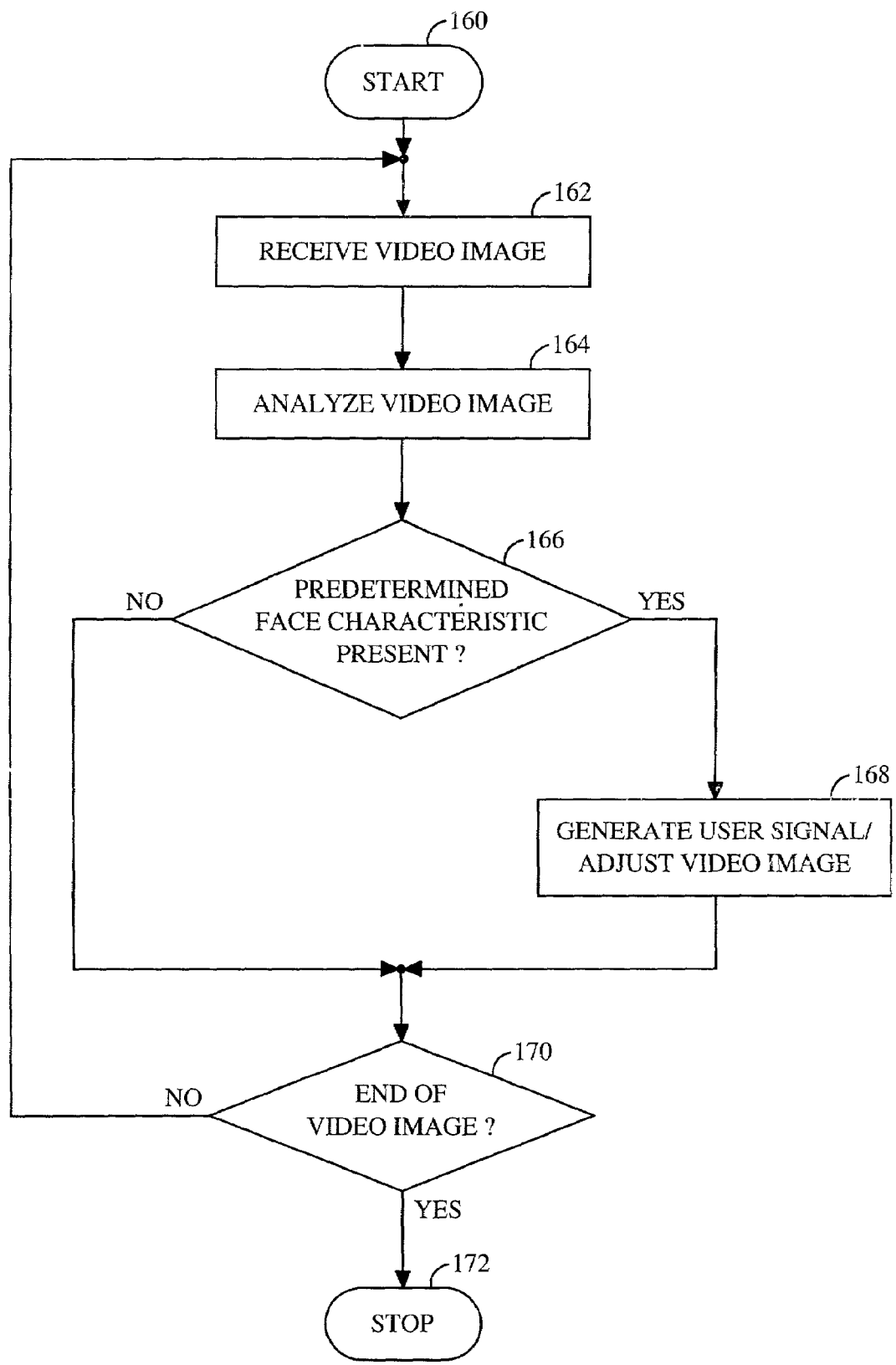
FIG. 4 is a flowchart illustrating the operation of the system of FIG. 1 to signal to the user a suggested course of action to adjust a video image or, alternatively, to automatically adjust the video image.

The operation of the system 100 to signal to the user a suggested course of action to adjust a video image received by the video-input device 118 is illustrated by FIG. 4. At a start 160, the wireless communications device is under power. At step 162, the system receives a video image from the video-input device 118. At step 164, the image-recognition processor 126 analyzes the video image, recognizes characteristics of a face in the video image and compares the characteristics of the face in the video image to a predetermined set of face-characteristics. At decision 166, the system 100 determines whether one of the predetermined set of face characteristics is present in the face in the video image.

If one of the predetermined face-characteristics is present, the result of decision 166 is YES. In that event the system 100 generates a predetermined user-signal corresponding to the predetermined face-characteristic in step 168. The user may take action in response to the user-signal, such as adjusting the video-input device. Alternatively, the system 100 may automatically adjust the video image received by the system 100 in step 168, wherein the adjustment is based at least in part on the predetermined face characteristic. Those skilled in the art will recognize that the system 100 may generate a user-signal or adjust the video image, or some combination thereof, in step 168. The system 100 then proceeds to decision 170.

If none of the predetermined face-characteristics are present, the result of decision 166 is NO. In that event the system 100 proceeds to decision 170.

At decision 170, the system 100 determines whether it is still receiving a video image. If the video-input device 118 is still receiving a video image, the result of decision 170 is YES. In that event, the system 100 returns to step 162 to receive additional video images. If the video input device is no longer receiving a video image, the result of decision 170 is NO. In that event the system 100 ends the operation in step 172.

Those skilled in the art will recognize that additional steps, such as error checking routines and transmission of the video-image received by the system 100, and the like, may be performed. For the sake of brevity, those flowcharts will not be repeated herein. However, one of ordinary skill in the art may readily implement such processes based on the present disclosure.

It is to be understood that even though various embodiments and advantages of the present invention have been set forth in the foregoing description, the above disclosure is illustrative only, and changes may be made in detail, yet remain within the broad principles of the invention. For example, the set of predetermined face characteristics are described above as a set of undesirable characteristics. However, the system 100 may be readily implemented using a set of predetermined desirable face characteristics. The image-recognition processor 126 (see FIG. 1) can generate the selectively-generated feedback signals when the image is altered in an unacceptable manner. Therefore, the present invention is to be limited only by the appended claims.

What is claimed is:

1. A system to provide feedback on a face in a video image received by a wireless communication device, the system comprising:
   a video-input device to receive the video image;
   an image-recognition processor coupled to the video-input device to receive and analyze the video image, wherein the image-recognition processor is configured to recognize characteristics of the face in the received video image, compare the characteristics of the face in the received video image to a predetermined set of face-characteristics and selectively generate a feedback signal based on the comparison;
   a signaling device to receive the selectively-generated feedback signal and selectively generate a user-signal based at least in part on the feedback signal received from the image-recognition processor; and
   a transmitter to transmit the received video image to a remote location.

2. The system of claim 1 wherein the selectively-generated feedback signal is one of a predetermined set of feedback signals to convey information related to the comparison of the characteristics of the face in the received video image to the predetermined set of face-characteristics and the user-signal is one of a predetermined set of user-signals to convey information to the user related to the comparison of the face in the received video image to the predetermined set of face-characteristics.

3. The system of claim 1 wherein the selectively-generated user-signal comprises an audio signal.

4. The system of claim 1 wherein the selectively-generated user-signal comprises a visual signal.

5. The system of claim 4 wherein the selectively-generated user-signal comprises a video signal.

6. A system to provide feedback on a face in a video image received by a wireless communication device, the system comprising:
   a video-input device to receive the video image;
   an image-recognition processor coupled to the video-input device to receive and analyze the video image, wherein the image-recognition processor is configured to recognize characteristics of the face in the received video image, compare the characteristics of the face in the received video image to a predetermined set of face-characteristics and selectively generate a feedback signal based on the comparison;
   an image-adjustment device to adjust the image received by the video-input device, wherein the adjustment is based at least in part on the selectively-generated feedback signal; and
   a transmitter to transmit the received video image to a remote location.

7. The system of claim 6 wherein the selectively-generated feedback signal is one of a set of predetermined feedback signals.

8. A method to provide feedback on a face in a video image received by a wireless communication device, the method comprising:
   receiving the video image;
   comparing characteristics of the face in the received video image to a predetermined set of face-characteristics and selectively generating a feedback signal on the comparison;
   selectively generating a user-signal based at least in part on the comparison of the face in the received video image to the predetermined set of face-characteristics; and
   transmitting the received video image to a remote location.

9. The method of claim 8 wherein the selectively-generated user-signal is one of a predetermined set of user-signals to convey information to the user related to the comparison of the face in the received video image to the predetermined set of face-characteristics.

10. The method of claim 8 wherein the selectively-generated user-signal comprises an audio signal.

11. The method of claim 8 wherein the selectively-generated user-signal comprises a visual signal.

12. The method of claim 11 wherein the selectively-generated user-signal comprises a video signal.

13. A method to provide feedback on a face in a video image received by a wireless communication device, the method comprising:
   receiving the video image;
   comparing characteristics of the face in the received video image to a predetermined set of face-characteristics and selectively generating a feedbag signal based on the comparison;
   automatically adjusting the wireless communications device based at least in part on the comparison of the characteristics of the face in the received video image to the predetermined set of face characteristics; and
   transmitting the received video image to a remote location.

* * * * *